US008419838B2

(12) United States Patent
Itami

(10) Patent No.: US 8,419,838 B2
(45) Date of Patent: Apr. 16, 2013

(54) PROCESS FOR PREPARING MEMBRANES

(75) Inventor: Yujiro Itami, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 195 days.

(21) Appl. No.: 12/936,598

(22) PCT Filed: Apr. 6, 2009

(86) PCT No.: PCT/GB2009/050335
§ 371 (c)(1),
(2), (4) Date: Oct. 6, 2010

(87) PCT Pub. No.: WO2009/125217
PCT Pub. Date: Oct. 15, 2009

(65) Prior Publication Data
US 2011/0023717 A1 Feb. 3, 2011

(30) Foreign Application Priority Data

Apr. 8, 2008 (EP) .................................... 08006970

(51) Int. Cl.
*B01D 53/22* (2006.01)
(52) U.S. Cl.
USPC ................. 96/11; 95/45; 95/51; 96/10; 96/12
(58) Field of Classification Search ................ 95/45, 51; 96/10–12
See application file for complete search history.

(56) References Cited

U.S. PATENT DOCUMENTS

| 2,761,791 | A |   | 9/1956  | Russell ........................... 117/34 |
| 3,417,870 | A |   | 12/1968 | Bray .............................. 210/321 |
| 3,620,970 | A | * | 11/1971 | Klug et al. .................... 210/655 |
| 3,648,845 | A | * | 3/1972  | Riley ............................. 210/490 |
| 4,229,889 | A | * | 10/1980 | Petrosky .......................... 36/28 |
| 4,713,292 | A | * | 12/1987 | Takemura et al. ............. 428/372 |
| 4,746,430 | A |   | 5/1988  | Cooley ..................... 210/321.85 |
| 4,806,189 | A |   | 2/1989  | Kraus et al. .................... 156/155 |
| 4,840,819 | A |   | 6/1989  | Williams et al. ............... 427/245 |
| 4,976,897 | A |   | 12/1990 | Callahan et al. ................ 264/22 |
| 5,059,220 | A |   | 10/1991 | Bleha et al. .................... 55/158 |
| 5,069,926 | A |   | 12/1991 | Iwata et al. .................... 427/40 |
| 5,096,584 | A |   | 3/1992  | Reddy et al. ............. 210/321.74 |
| 5,102,552 | A |   | 4/1992  | Callahan et al. ............. 210/654 |
| 5,500,167 | A |   | 3/1996  | Degen ............................. 264/41 |
| 5,514,413 | A |   | 5/1996  | Van't Hof et al. ............. 427/244 |
| 5,556,449 | A |   | 9/1996  | Baker et al. ..................... 95/49 |
| 5,580,650 | A |   | 12/1996 | Forgach et al. ............. 428/304.4 |
| 5,980,989 | A | * | 11/1999 | Takahashi et al. ............. 427/294 |
| 8,052,775 | B2| * | 11/2011 | Hou et al. ......................... 95/43 |
| 8,075,669 | B2| * | 12/2011 | Meindl et al. ..................... 95/46 |
| 2002/0038602 | A1 |   | 4/2002 | Nelson et al. ..................... 95/45 |
| 2003/0180425 | A1 |   | 9/2003 | Sanchez et al. ................ 426/419 |
| 2006/0138043 | A1 |   | 6/2006 | Kharul et al. .................. 210/490 |
| 2007/0137477 | A1 |   | 6/2007 | Freeman et al. ................... 95/45 |

FOREIGN PATENT DOCUMENTS

| GB | 837095 | 6/1960 |
| GB | 2 174 619 | 11/1986 |
| JP | 07060079 A * | 3/1995 |
| JP | 07-60079 | 7/1995 |
| JP | 08-024602 | 1/1996 |
| JP | 08-024603 | 1/1996 |
| JP | 08024602 A * | 1/1996 |
| JP | 08024603 A * | 1/1996 |
| WO | WO 2005/068056 | 7/2005 |
| WO | WO 2007/018425 | 2/2007 |

OTHER PUBLICATIONS

International Search Report issued in PCT Application No. PCT/B2009/050335.
Hirayama at al.,"Pemeation properties to $CO_2$ and $N_2$ of poly(ethylene oxide)-containing and crosslinked polymer films", Journal of Membrane Science, 160:87-99 (1999).
Jons et al., "Porous latex composite membranes fabrication and properties", Journal of Science, 155:79-99 (1999).
Ju et al., "Crosslinked poly(ethylene oxide) fouling resistant coating materials for oil/water separation", Journal of Membrane Science, 307:260-267 (2008).
Lin et al., "Materials selection guidelines for membranes that remove $CO_2$ from gas mixtures", Journal of Molecular Structure, 739:57-74 (2005).
Lin et al., "Transport and structural characteristics of crosslinked poly(ethylene oxide) rubbers", Journal of Membrane Science, 276:145-161 (2006).
Ramakrishnan et al.,"Late composite membranes: structure and properties of the discriminating layer", 231:57-70 (2004).

* cited by examiner

*Primary Examiner* — Jason M Greene
*Assistant Examiner* — Anthony Shumate
(74) *Attorney, Agent, or Firm* — Morgan, Lewis & Bockius LLP

(57) ABSTRACT

A process for preparing a composite membrane comprising a porous support layer and a discriminating layer, comprising the steps of:
(a) providing a porous support layer;
(b) incorporating an inert liquid into the pores of the support layer;
(c) applying a curable composition to the support layer; and
(d) curing the composition, thereby forming the discriminating layer on the porous support.
The process is particularly useful for preparing gas separation composite membranes.

16 Claims, No Drawings

PROCESS FOR PREPARING MEMBRANES

This invention relates to composite membranes and to processes for their preparation and use, particularly for separating gases.

The use of membranes to separate gases is known in the art. Membranes have been used to recover or isolate a variety of gases, including hydrogen, helium, oxygen, nitrogen, carbon monoxide, carbon dioxide, water vapour, hydrogen sulphide, ammonia, and/or light hydrocarbons.

The known separation processes are based on differences in the relative permeability of two or more gases through a membrane. Typically a mixture of gasses is brought into contact with one side of a membrane through which at least one of the gases permeates faster than the other gases. In this way a gas stream is separated into two streams, one which is enriched in the selectively permeating gas(es).

From a gas flux point of view, very thin membranes are preferred. However thin membranes are weaker than thicker membranes and run a greater risk of tearing, bursting and mechanical damage.

To improve the mechanical strength of membranes, without compromising gas flux rates, it is not uncommon to use composite membranes comprising a porous support layer and a gas discriminating membrane layer. The porous support layer does not discriminate between gases but instead it provides mechanical strength. The gas discriminating membrane layer on the other hand performs the task of selectively allowing one or more gases to pass through more easily than other gases, providing a degree of gas separation and enrichment. In this way higher flux rates can be achieved than if an unsupported, thick membrane were used, while at the same time the mechanical strength and durability of the membrane is enhanced.

Previously known composite membranes have not been completely satisfactory since they can exhibit a variety of defects which affect their overall efficiency.

One approach for making composite membranes has been to coat a UV-curable composition onto a microporous support followed by curing. However membranes prepared in this way often suffer from poor flux rates. Without wishing to be bound by any particular theory, one potential cause of the poor flux rates could be that the UV-curable compositions tend to "wick up" and fill the pores of the microporous support thereby producing a membrane having an insufficient flux and a discriminating layer of unsuitable effective thickness.

U.S. Pat. No. 4,976,897 attempted to overcome the problem of undesirable "wicking" and pore filling by coating a microporous support with a UV curable resin having a sufficiently high viscosity to prevent pore filling upon coating and curing. The resin had a viscosity of at least 35,000 cP and was subsequently cured using UV light. However the very high viscosity of the compositions used made them difficult to handle and unsuitable for use in high speed coating machines.

In U.S. Pat. No. 5,580,650, the discriminating layer and porous support were formed separately and then 'glued' together afterwards. This technique was rather complicated and did not lend itself well to mass production of membranes.

We have now devised a way of producing composite membranes with good flux rates and which can be used for the mass production of composite membranes.

According to the present invention there is provided a process for preparing a composite membrane comprising a porous support layer and a discriminating layer, comprising the steps of:
 (a) providing a porous support layer;
 (b) incorporating an inert liquid into the pores of the support layer;
 (c) applying a curable composition to the support layer; and
 (d) curing the composition, thereby forming the discriminating layer on the porous support.

The primary purpose of the porous support layer is to provide mechanical strength to the discriminating layer without materially reducing the flux rate. Therefore the porous support layer is typically open pored, relative to the discriminating layer.

The porous support layer may be, for example, a microporous organic or inorganic membrane, or a woven or non-woven fabric. The porous support layer may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, and poly(4-methyl 1-pentene).

One may use, for example, a commercially available, porous sheet material as the support layer. Alternatively one may prepare the porous support layer using techniques generally known in the art for the preparation of microporous materials. In one embodiment one may prepare a porous, non-discriminatory support layer by curing curable components, then apply further curable components to the formed porous support and curing such components thereby forming a discriminating layer on the already cured porous support layer.

The inert liquid may be any liquid which does not dissolve the porous support or polymerise in step (d). Typically the inert liquid will consist essentially of water, an organic solvent, a mixture comprising of two or more organic solvents or a mixture of water and one or more organic solvents. Preferably the inert liquid is immiscible with the composition because this reduces the likelihood of the composition permeating into the pores of the support prior to curing. The inert liquid may be incorporated into the porous support by any means, for example by soaking the porous support layer with the inert liquid. Preferably any excess inert liquid is allowed to drain off before performing step (c).

The inert liquid may also be incorporated into the pores of the support layer by coating the inert liquid thereon, e.g. by spray, slide or curtain coating. Some or all of the inert liquid may be allowed to permeate into the pores before the curable composition is applied to the support layer. When only some of the inert liquid permeates into the pores before the curable composition is applied to the support layer, direct contact between the curable composition and the support layer may be subject to a small delay caused by the time taken for the inert liquid to adsorb into the layer and/or for the time taken for the curable composition to descend through the inert liquid layer to make contact with the support layer. This time delay does not particularly matter, although one will normally not perform curing step (d) until the curable material is in direct contact with the porous layer because no direct contact with the porous layer would lead to no adhesion or to poor adhesion between the resultant discriminating layer and the porous layer. Preferably there is a time interval of at least 1 second between the start of step (c) and the start of step (d).

Examples of suitable coating methods include spray coating, dip coating, air-knife coating, nip roll coating, forward roll coating, reverse roll coating, rod bar coating, kiss coating, curtain coating, extrusion coating, slide coating and slot die coating. Useful background information for various coating methods can be found in "LIQUID FILM COATING" (Chapman & Hall, 1997), e.g. on pages 399 to 536. An example of the shape of a slide coater is shown in FIG. 11b.1, page 427, of the same literature. If desired, two or more layers can be coated simultaneously by the method described in pages 399 to 536 of the same literature, or by the method described in U.S. Pat. No. 2,761,791 or British Patent No. 837,095.

Preferably the pores of the porous support are completely filled or substantially filled, e.g. to the extent of at least 80 vol %, more preferably at least 90 vol %, with the inert liquid. In this way a smoother discriminating layer may be formed than would be the case if the pores were only partly filled with inert liquid and the discriminating layer is not rendered unduly thick by seepage into the pores. If desired the saturated porous support layer may be degassed to avoid gas bubbles roughening the discriminating layer.

The curable composition may be applied to the porous support by any suitable method, for example by curtain coating, extrusion coating, air-knife coating, slide coating, slot die coating, nip roll coating, forward roll coating, reverse roll coating, dip coating, kiss coating, rod bar coating or spray coating. If desired one or more further layers of curable composition(s) may be applied to the porous layer carrying the curable composition, either with or without intermediate curing of the curable composition first applied to the porous layer. The coating of multiple layers can be done simultaneously or consecutively, for example using any of the suitable coating methods mentioned above or combinations or two or more thereof.

Conveniently the inert liquid and the curable composition may be coated onto the support layer by a multilayer coating method, for example a simultaneous multilayer coating method or a consecutive multilayer coating method. In these methods the inert liquid is of course applied to the support layer ahead of the curable composition, such that steps (b) and (c) of the process are performed in that order.

In a preferred simultaneous multilayer process a layer of inert liquid and a layer of the curable composition are applied simultaneously to the support layer with the inert liquid layer being the lower layer and therefore contacting the support ahead of the curable composition. As the inert liquid is absorbed into the support layer, the pores of the support layer fill, at least partly, thereby preventing the curable layer from penetrating deep within the support before curing step (d).

In a preferred consecutive multilayer process a layer of inert liquid and a layer of the curable composition are applied consecutively to the support layer, with the inert liquid layer being applied before the curable composition. As with the simultaneous multilayer process the inert liquid is absorbed into the support layer, at least partly, thereby preventing the curable layer applied afterwards from penetrating deep within the support before curing step (d).

In simultaneous and consecutive multilayer coating methods more than one layer of curable composition may be applied, if desired, to give a discriminating layer which has multiple layers and/or which is anisotropic.

Preferred simultaneous multilayer coating methods which may be used to perform step (b) and (c) simultaneously include curtain coating, extrusion coating, slot die coating and slide bead coating, especially slide bead coating. Preferred consecutive multilayer coating method comprises dip coating (e.g. for step (b)) and slide bead coating (e.g. for step (c)).

In order to produce a sufficiently flowable composition for use in a high speed coating machine, it is preferred that the viscosity of the curable composition is below 4000 mPa·s when measured at 35° C., more preferably from 1 to 1000 mPa·s when measured at 35° C. Most preferably the viscosity of the curable composition is from 1 to 500 mPa·s. For coating methods such as slide bead coating the preferred viscosity is from 1 to 100 mPa·s, whether the coating material is the curable composition or the inert liquid. This can be contrasted with the process used in U.S. Pat. No. 4,976,897 where very high viscosities (preferably 50,000 to 500,000 cP) were essential. The desired viscosity is preferably achieved by controlling the amount of solvent (e.g. water) in the curable composition.

In the multi-layer coating methods mentioned above one may apply a lower inert liquid layer to the porous support and the inert liquid preferably fills the pores of the support. On top of that lower layer (in the case when the inert liquid has not yet all been absorbed by the porous layer) one or more upper layers of curable composition(s) are applied.

Depending on the porosity parameters of the support, the method chosen to apply the inert liquid and the curable composition(s) to the support and the process conditions used it may be preferred to include a viscosity enhancing agent in the curable composition to increase its viscosity. For example one may use a water-soluble polymer as binder and/or a high molecular weight cross-linkable compound. The viscosity enhancing agent helps to prevent disturbances in the structure of the discriminating layer which could cause defects and reduce the quality of the membrane. Examples of viscosity enhancing agents include: poly (meth)acrylic acid in free acid or salt form; poly alkylene oxides, e.g. poly (ethylene oxide) and poly(propylene oxide); polyvinyl alcohol; polyvinyl pyrrolidone; poly alkyl(meth)acrylate; polystyrene; polyolefins; polyesters; polyethers; polyamides, and copolymers of the foregoing. The preferred molecular weight (MW) of the viscosity enhancement agents is 10 kD to 20000 kD, preferably 100 kD to 10000 kD, e.g. about 1000 kD or about 8000 kD. The preferred concentration for the viscosity enhancement agents is 0.01 wt % to 10 wt %, more preferably 0.02 wt % to 5 wt %, especially 0.03 wt % to 2 wt %, relatively to the total weight of the other components in the composition.

In another embodiment the curable composition is free from viscosity enhancing agents (e.g. free from binders and high molecular weight cross-linkable compounds). In this embodiment the viscosities of both the inert liquid and the curable composition are low and preferably the process is performed such that steps are taken to ensure there is no or little turbulence when the various liquids are applied to the support.

With suitable coating techniques coating speeds of at least 15 m/min, e.g. more than 20 m/min or even higher, such as 60 m/min, 120 m/min, up to 400 m/min, can be reached. In a preferred embodiment the curable composition and/or the inert liquid are applied to the support layer at the aforementioned coating speeds.

Before applying the curable composition to the surface of the porous support this support may be subjected to a corona discharge treatment, glow discharge treatment, flame treatment, ultraviolet light irradiation treatment or the like, e.g. for the purpose of improving its wettability and the adhesiveness.

While it is possible to practice the invention on a batch basis with a stationary porous support, to gain full advantage of the invention, it is much preferred to practice it on a continuous basis using a moving porous support, e.g. the porous support layer may be in the form of a roll which is unwound continuously or the porous support layer may rest on a continuously driven belt. Using such techniques the curable composition can be applied to the porous support on a continuous basis or it can be applied on a large batch basis, e.g. the composition may be applied continuously onto the upstream end of the porous support, the irradiation source being located downstream of a composition application station, a composite membrane removal station—if applicable—being further downstream of the irradiation source, the composite membrane being removed in the form of a continuous sheet, and a composite membrane collecting station. Removal of the inert liquid from the composite membrane can be accomplished either before or after the membrane is taken from the apparatus, e.g. by evaporation. If desired the inert liquid may remain in the composite membrane during storage.

Thus in a preferred process the curable composition is applied continuously to the porous support layer by means of a manufacturing unit comprising a curable composition application station, an irradiation source, a composite membrane collecting station and a means for moving a porous support layer from the curable composition application station to the irradiation source and to the composite membrane collecting station. The curable composition application station is located at an upstream position relative to the irradiation source and the irradiation source is located at a an upstream position relative to the composite membrane collecting station, such that the process steps occur in the order (a), (b), (c), (d).

Step (b) where the inert liquid is incorporated into the pores of the porous support layer may be performed simultaneously or separately from step (c) where the curable composition is applied. When step (b) is performed separately from step (c) there may be an inert liquid application station located at an upstream position relative to the curable composition application station.

The porous support is not limited to sheet form, also porous supports in tubular form like hollow fibres can be used.

The porous support layer preferably possesses pores which are as large as possible, consistent with providing a smooth surface for the discriminating layer. The porous support layer preferably has average pore size of at least about 50% greater than the average pore size of the discriminating layer, preferably at least about 100% greater than the average pore size of the discriminating layer, more preferably at least about 200% greater than the average pore size of the discriminating layer.

The pores in the porous support layer will generally have an average size of 0.0005 to 10 µm, preferably 0.001 to 1 µm. The pore size distribution of the porous support may be quite narrow, although this is not essential for satisfactory performance. Also an asymmetric structure may be used as is described in U.S. Pat. No. 5,702,503. For application as gas separating membrane the preferred porosity of the porous support may be expressed as a $CO_2$ permeance of 5 to 150× $10^{-5}$ $m^3(STP)/m^2 \cdot s \cdot kPa$, more preferably of 5 to 100, most preferably of 7 to 70×$10^{-5}$ $m^3(STP)/m^2 \cdot s \cdot kPa$.

The porous support layer should be as thin as possible so long as it retains the desired structural strength.

The discriminating layer possesses pores which have a size providing the desired separation properties. For separating gases and/or vapours the discriminating layer is preferably substantially non-porous or has pores of very small dimensions, typically an average pore size below 10 nm; more preferably below 5 nm, especially below 2 nm. Preferably the discriminating layer has a very low permeability to liquids. In one embodiment the composite membrane has a pure water permeability at 20° C. of less than $6.10^{-8}$ $m^3/m^2 \cdot s \cdot kPa$, more preferably less than $3.10^{-8}$ $m^3/m^2 \cdot s \cdot kPa$.

The discriminating layer is preferably as thin as possible to ensure good flux rates across the composite membrane while being sufficiently thick for practical use in the end technical field of interest. The dry thickness of the discriminating layer will typically range from 0.02 to 10 µm, preferably from 0.02 to 4 µm, especially from 0.05 to 2 µm.

The overall dry thickness of the composite membrane will typically range from 20 to 500 µm, preferably from 30 to 300 µm.

The composition may be cured by any suitable means. Preferably the composition is a radiation curable composition and in step (d) the curing is caused by irradiation. In this embodiment the irradiation may be by any source which provides the wavelength and intensity of radiation necessary to cause the composition to polymerise. For example, electron beam, UV, visible and infra red radiation may be used to cure the composition, the appropriate radiation being selected to match the composition. For UV curing a mercury arc lamp is particularly effective, but light emitting diodes can also be used.

Preferably curing of the composition begins within 7 seconds, more preferably within 5 seconds, most preferably within 3 seconds, of the composition being applied to the porous support.

Preferably the composition is a radiation curable composition and the curing is achieved by irradiating the composition for less than 30 seconds, more preferably less than 10 seconds, e.g. within 5 seconds.

To reach the desired dose at high coating speeds more than one UV lamp may be required, so that the curable composition is exposed to more than one lamp. When two or more lamps are used all lamps may give an equal dose or each lamp may have an individual setting. For instance the first lamp may give a higher dose than the second and following lamps or the exposure intensity of the first lamp may be lower.

In this specification, compounds having one crosslinkable group are often referred to as monofunctional compounds, compounds having two crosslinkable groups are often referred to as difunctional compounds and compounds having three or more crosslinkable groups are often referred to as polyfunctional compounds.

The curable composition preferably comprises:
(i) 0 to 80 parts in total of monofunctional compounds;
(ii) 1 to 99 parts in total of difunctional compounds;
(iii) 0 to 50 parts in total of polyfunctional compounds;
(iv) 2 to 99 parts of an inert liquid;
wherein all parts are by weight.

The monofunctional compound, i.e. component (i), is unable to cross-link because it has only one cross-linkable group. However it is able to react with other components present in the curable composition. The presence of at least some monofunctional compound is often desirable because monofunctional compounds can provide the resultant discriminating layer with a desirable degree of flexibility. Curable compositions containing only difunctional and polyfunctional compounds can sometimes be rather rigid and in some cases this can adversely affect the rate of gas flux through the resultant composite membrane. However too much monofunctional compound can lead to a discriminating layer with a very loose structure and poor selectivity. Also the efficiency of curing step (d) can reduce when large amounts of monofunctional compounds are used, increasing the time taken to complete curing step (d) and potentially requiring inconvenient conditions for step (d). Bearing these factors in mind, the number of parts of component (i) is preferably 0 to 40, more preferably 0 to 20 parts by weight.

The difunctional compound, i.e. component (ii), is usually the major or sometimes the only polymerisable component in the curable composition. Generally the difunctional component provides strength to the discriminating layer. It may also assist the discriminating layer in distinguishing between gases by the presence of chemical groups (e.g. oxyethylene groups) which have an affinity or aversion to certain gases.

The number of parts of component (ii) is preferably 1 to 60, more preferably 2 to 40, especially 2 to 20 parts by weight.

The polyfunctional compounds (iii) can also provide strength to the discriminating layer. The presence of 3 or more crosslinkable groups also helps the formation of a three dimensional polymer network in the resultant discriminating layer. However too much polyfunctional compound may lead to a rigid structure and inflexibility of the discriminating layer may result. Bearing these factors in mind, the number of parts of component (iii) is preferably 0 to 30, more preferably 0 to 10, especially 0 to 5 parts by weight.

The function of the inert liquid (iv), when present, is to provide the curable composition with a viscosity suitable for the particular method used to apply the curable composition to the porous support. For high speed application processes one will usually choose an inert liquid of low viscosity. The viscosity may also be chosen to take into account the viscosity of the inert liquid used in step (b) which may be the same as or different from the inert liquid used as component (iv). The number of parts of component (iv) is preferably 50 to 99, more preferably 60 to 99, especially 70 to 99, more especially 75 to 99 parts by weight.

Typically the inert liquid used as component (iv) (and/or in step (b)) comprises water and optionally one or more organic solvents, especially water-miscible organic solvent(s). The weight ratio of water to organic solvent used in component (iv) depends to some extent on the type and relative amounts of components in the curable composition and is preferably from 1:1 to 40:1, more preferably 2:1 to 30:1, especially 3:1 to 20:1. The inert liquid used in step (b) is preferably free from organic solvents.

As examples of water-miscible organic solvents there may be mentioned: $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and one or more, especially from 1 to 8, water-soluble organic solvents.

Component (iv) may contain other components, for example surfactants, surface tension modifiers, viscosity enhancing agents, biocides or other ingredients.

While this does not rule out the presence of other components in the composition (because it merely fixes the relative ratios of components (i), (ii), (iii) and (iv)), preferably the number of parts of (i)+(ii)+(iii)+(iv) add up to 100. When the number of parts of (i)+(ii)+(iii)+(iv) add up to 100 then the number of parts of (ii) are 1 to 98, preferably 2 to 60, more preferably 2 to 40, especially 2 to 20 parts by weight.

Taking the above factors into account, the curable composition preferably comprises:
(i) 0 to 20 parts in total of monofunctional compounds;
(ii) 1 to 20 parts (preferably 2 to 20 parts) in total of difunctional compounds;
(iii) 0 to 5 parts in total of polyfunctional compounds;
(iv) 75 to 99 parts of an inert liquid;
(v) 0.01 to 5 parts of photoinitiator;
wherein all parts are by weight.

Preferably the number of parts of (i)+(ii)+(iii)+(iv)+(v) add up to 100.

Examples of suitable crosslinkable groups include ethylenically unsaturated groups, for example acrylate groups, methacrylate groups, acrylamide groups, vinyl ether groups, vinyl ester groups, vinyl amide groups, allyl ether groups, allyl ester groups, allyl amine groups, allyl amide groups, styryl groups, maleic groups, fumaric groups, glutaconic groups, itaconic groups, citraconic groups, mesaconic groups, tiglic groups, angelic groups, senecioic groups and epoxy groups, oxetane groups.

The preferred crosslinkable groups are (meth)acrylic ($CH_2$=CR—C(O)—) groups, especially (meth)acrylate ($CH_2$=CR—C(O)O—) groups, wherein R is H or $CH_3$.

Preferred ethylenically unsaturated groups in the crosslinkable group are unsubstituted. Substituted ethylenically unsaturated groups are less reactive than non-substituted ethylenically unsaturated groups due to steric hindrance, which will result in slower cure in step (d). For high speed production methods fast cure is desired.

When a large part of the crosslinkable groups in the curable composition are substituted ethylenically unsaturated groups, curing step (d) preferably uses a high energy radiation source, for example electron beam irradiation or plasma treatment.

The curable composition preferably comprises a greater proportion of unsubstituted ethylenically unsaturated compounds than substituted ethylenically unsaturated compounds (or even no substituted ethylenically unsaturated compounds) because this can result in improvements in gas flux.

The preferred cross-linkable groups are acrylate groups because of their fast polymerisation rates, especially when using UV light to effect the polymerisation. Many compounds having acrylate groups are also easily available from commercial sources.

The network structure of the discriminating layer is determined to a large extent by the identify of crosslinkable compounds and their functionality, e.g. the number of crosslinkable groups they contain per molecule.

One approach for ensuring the resultant discriminating layer has the desired degree of flexibility without relying wholly (or even partly) on the inclusion of a monofunctional compound is to include within component (b) (the difunctional compound(s)) a large difunctional compound and/or a difunctional compound where the functional (i.e. crosslinkable) groups are far apart. So, for example, as curable compound in component (b), one may use a high molar weight difunctional compound, e.g. a difunctional compound wherein the two crosslinkable groups are located on opposite the ends of a large, optionally linear molecule. In this way the desired flexibility is achieved in the discriminating layer without having to include a monofunctional compound, although a monofunctional compound may still be included if desired.

The high molecular weight difunctional compound suitable for providing the desired degree of flexibility in the discriminating layer typically has a molecular weight of at least 500 Da, more preferably at least 1000 Da, especially at least 1200 Da and more especially at least 1500 Da. Molecular weights as high as 20, 40 or even 60 kDa or more may be used. Preferably the molecular weight of the high molecular weight difunctional compound is below 100 kDa.

The curable composition may also comprise polymers comprising two or more reactive groups, e.g. (meth)acrylated polyesters, (meth)acrylated polyamides, (meth)acrylated polyurethanes, (meth)acrylated polyacrylates, epoxylated polyesters, epoxylated polyurethanes, epoxylated polyacrylates, etc. Such polymers preferably have a molecular weight of less than 10000 kDa.

For the separation of polar gases and vapours (e.g. $CO_2$, $H_2S$, $H_2O$, $SO_2$, etc.) the curable composition preferably has a high oxyethylene content, as described in more detail below.

To achieve a high oxyethylene content one may use mono-, di- and/or polyfunctional compounds (especially difunctional compounds) in the curable composition which are rich in oxyethylene groups, e.g. those which comprise at least 10 oxyethylene groups, more preferably at least 15, especially at least 25 or even 35 oxyethylene groups.

There is no specific limit to the maximum number of oxyethylene groups in the cross-linkable compounds used in the curable composition, but crystallization of the poly-oxyethylene chain under the conditions the composite membrane is used should be prevented as much as possible, because in crystallized form the gas flux rate through the composite membrane can be severely reduced.

In high temperature uses (e.g. separation of flue gas or water vapour) discriminating layers with matrices crystallizing at or below room temperature can be used without negative effects on the flux because the operating temperature of the membrane is higher than the crystallization temperature of the poly-oxyethylene chains in the discriminating layer.

The likelihood of undesirable crystallisation in discriminating layers derived from cross-linkable compounds containing a large amount of oxyethylene groups can be reduced by including one or more cross-linkable compounds which are free from oxyethylene groups in the curable composition.

The presence in the curable composition of cross-linkable compounds which are free from oxyethylene groups will of course lower the oxyethylene content of the discriminating layer and if the content is too low this can adversely affect the ability of the discriminating layer from separating polar and non-polar gases. If the intention is not to separate polar and non-polar gases than there is no problem, however if polar/non-polar gas separation is the objective then a balance needs to be struck between the desire for flexibility in the membrane and the desire for a high degree of selectivity between polar and non-polar gases.

Preferably oxyethylene groups constitute at least 50 wt %, more preferably at least 60 wt and especially at least 70 wt % of the total weight of non-volatile components (usually components (i), (ii) and (iii)) in the curable composition, although component (iv) also may comprise compounds rich in oxyethylene groups). The preferred upper limit is 96 wt % of the total weight of non-volatile components.

The presence in the curable composition of cross-linkable compounds which are free from oxyethylene groups can be particularly useful in fields such as air separation and hydrocarbon separation, e.g. a crosslinkable silicone polymers such as divinyl-polydimethylsiloxane can prove useful as components for the curable composition.

The preferred upper limit for the content of oxyethylene groups in the discriminating layer is 95 weight %.

The oxyethylene groups which may be present in the crosslinkable compounds or the monofunctional compounds optionally comprises an uninterrupted or an interrupted chain. A preferred uninterrupted chain of oxyethylene, groups is of formula —$(CH_2CH_2O)_n$— wherein n is 5 to 500. A preferred interrupted chain of oxyethylene groups is of the formula —$(CH_2CH_2O)_{n-q}$—R—$(OCH_2CH_2)_q$—, wherein q is 1 to n−1, n is 5 to 500 and R is —$CH_2$—, —$(CH_2)_x$— wherein x>2 (e.g. x is 3 to 6), —$CH(CH_3)$—, —$C(CH_3)_2$—, —$CH_2$—$C(CH_3)_2$—$CH_2$—, —$C_6H_4$—, —$C_6H_4$—$C(CH_3)_2$—$C_6H_4$— (bisphenol A) or —(C=O)—.

The wt % oxyethylene groups in the curable composition is calculated as illustrated in the Examples.

Examples of suitable monofunctional compounds include 2-hydroxyethyl acrylate, 2-hydroxyethyl methacrylate, polyethylene glycol monoacrylate, polyethylene glycol monomethacrylate, hydroxypropyl acrylate, hydroxypropyl methacrylate, polypropylene glycol monoacrylate, polypropylene glycol monomethacrylate, 2-methoxyethyl acrylate, 2-phenoxyethyl acrylate, 2-phenoxyethyl methacrylate and combinations thereof.

Further examples of monofunctional compounds are of the following structure, wherein w is 1 to 100 and $R^{11}$ is H or an alkyl group of $C_1$-$C_{10}$ or an aromatic group or an alkoxy group or an ester group, and $R^{12}$ is H or a methyl group.

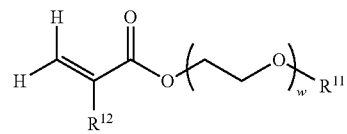

Examples of suitable difunctional compounds include poly(ethylene glycol)diacrylate, poly(ethylene glycol)divinyl ether, poly(ethylene glycol)diallyl ether, Bisphenol A ethoxylate diacrylate, neopentyl glycol ethoxylate diacrylate, propanediol ethoxylate diacrylate, butanediol ethoxylate diacrylate, hexanediol ethoxylate diacrylate, poly(ethylene glycol-co-propylene glycol)diacrylate, poly(ethylene glycol)-block-poly(propylene glycol)-block-poly(ethylene glycol) diacrylate, a diacrylate of a copolymer of polyethylene glycol and other building blocks e.g. polyamide, polycarbonate, polyester, polyimid, polysulfone, and combinations thereof.

Examples of suitable polyfunctional compounds include glycerol ethoxylate triacrylate, trimethylolpropane ethoxylate triacrylate, trimethylolpropane ethoxylate triacrylate, pentaerythrytol ethoxylate tetraacrylate, ditrimethylolpropane ethoxylate tetraacrylate, dipentaerythrytol ethoxylate hexaacrylate and combinations thereof.

In principle (electromagnetic) radiation of any suitable wavelength can be used in step (d), such as for example ultraviolet, visible or infrared radiation, as long as it matches the absorption spectrum of the photo-initiator, if present, or as long as enough energy is provided to directly polymerize (or cure) the composition without the need of a photo-initiator. Electron beam radiation may also be used. The terms curing and polymerization are used interchangeably throughout this document.

Curing by infrared radiation is also known as thermal curing. Thus where step (d) uses infrared radiation the curable composition preferably further comprises 0.01 to 5 parts of one or more thermally reactive free radical initiators per 100 parts of curable components in the curable composition, wherein all parts are by weight.

Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. α,α'-azobisisobutyronitrile and/or γ,γ'-azobis(γ-cyanovaleric acid); persulfates; peracetates, e.g. methyl peracetate and/or tert-butyl peracetate; peroxalates, e.g. dimethyl peroxalate and/or di(tert-butyl)peroxalate; disulfides, e.g. dimethyl thiuram disulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably step (d) uses ultraviolet light. Suitable wavelengths are for instance UV-A (400 to >320 nm), UV-B (320 to >280 nm), UV-C (280 to 200 nm), provided the wavelength matches with the absorbing wavelength of any photo-initiator included in the composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the discriminating layer. Preferably the exposure dose is at least 40 mJ/cm$^2$, more preferably between 40 and 600 mJ/cm$^2$, most preferably between 70 and 220 mJ/cm$^2$ as measured by an High Energy UV Radiometer (UV Power Puck™ from EIT—Instrument Markets) in the UV-B range indicated by the apparatus. Exposure times can be chosen freely but preferably are short and are typically less than 2 seconds.

Photo-initiators may be included in the curable composition and are usually required when step (d) uses UV or visible light radiation. Suitable photo-initiators are those known in the art such as radical type, cation type or anion type photoinitiators.

Examples of radical type I photo-initiators are as described in WO 2007/018425, page 14, line 23 to page 15, line 26, which are incorporated herein by reference thereto.

Examples of radical type II photo-initiators are as described in WO 2007/018425, page 15, line 27 to page 16, line 27, which are incorporated herein by reference thereto.

For acrylates, diacrylates, triacrylates and multifunctional acrylates, type I photo-initiators are preferred. Especially alpha-hydroxyalkylphenones, such as 2-hydroxy-2-methyl-1-phenyl propan-1-one, 2-hydroxy-2-methyl-1-(4-tert-butyl-)phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl)phenyl}propanone], alpha-aminoalkylphenones, alpha-sulfonylalkylphenones and acylphosphine oxides such as 2,4,6-trimethylbenzoyl-diphenylphosphine oxide, ethyl-2,4,6-trimethylbenzoyl-phenylphosphinate and bis(2,4,6-trimethylbenzoyl)-phenylphosphine oxide, are preferred.

Preferably the ratio of photo-initiator to components (i)+(ii)+(iii) is between 0.001 and 0.2 to 1, more preferably between 0.01 and 0.1 to 1, based on weight. It is preferred to minimize the amount of photo-initiator used, in other words preferably all photo-initiator has reacted after the curing step (or curing steps). A single type of photo-initiator may be used but also a combination of several different types.

Cationic photo-initiators are very suitable when the compounds have epoxy, oxetane or other ring opening heterocyclic groups or vinyl ether groups. Preferred cationic photo-initiators are organic salts of non-nucleophilic anions such as hexafluoroarsinate ion, antimony(V) hexafluoride-ion, phosphorus hexafluoride-ion and tetrafluoroborate ion. Commercially available examples include UVI-6974, UVI-6970, UVI-6990 (manufactured by Union Carbide Corp.), CD-1010, CD-1011, CD-1012 (manufactured by Sartomer Corp.), Adekaoptomer SP-150, SP-151, SP-170, SP-171 (manufactured by Asahi Denka Kogyo Co., Ltd.), Irgacure™ 250 Irgacure™ 261 (Ciba Specialty Chemicals Corp.), CI-2481, CI-2624, CI-2639, CI-2064 (Nippon Soda Co., Ltd.), DTS-102, DTS-103, NAT-103, NDS-103, TPS-103, MDS-103, MPI-103 and BBI-103 (Midori Chemical Co., Ltd.). The above mentioned cationic photo-initiators can be used either individually or in combination of two or more. The most preferred cationic photoinitiator is a triarylsulfonium hexafluoroantemonate, e.g. UVI-6974 (from Union Carbide).

When UV radiation is used in step (d) a UV light source can be selected having emissions at several wavelengths. The combination of UV light source and photo-initiator(s) can be optimized so that sufficient radiation penetrates deep into the discriminating layer(s) to activate the photo-initiators. A typical example is an H-bulb with an output of 600 Watts/inch (240 W/cm) as supplied by Fusion UV Systems which has emission maxima around 220 nm, 255 nm, 300 nm, 310 nm, 365 nm, 405 nm, 435 nm, 550 nm and 580 nm. Alternatives are the V-bulb and the D-bulb which have a different emission spectrum. Preferably the UV light source and the photo-initiators are chosen such that the wavelength of the UV light provided corresponds to the absorption of the photo initiator(s). From a choice of light sources and photo-initiators optimal combinations can be made. Applying multiple types of photo-initiator allows for thicker layers to be cured efficiently with the same intensity of irradiation.

When no photo-initiator is included in the curable composition, the curable composition can be advantageously cured by electron-beam exposure as is known in the art. Preferably the output is between 50 and 300 keV. Curing can also be achieved by plasma or corona exposure.

Curing rates may be increased by including amine synergists in the composition. Amine synergists are known to enhance reactivity and retard oxygen inhibition. Suitable amine synergists are e.g. free alkyl amines such as triethylamine, methyldiethanol amine, triethanol amine; aromatic amine such as 2-ethylhexyl-4-dimethylaminobenzoate, ethyl-4-dimethylaminobenzoate and also polymeric amines as polyallylamine and its derivatives. Curable amine synergists such as ethylenically unsaturated amines (e.g. (meth) acrylated amines) are preferable since their use will give less odour due to its ability to be incorporated into the discriminating layer by curing. The amount of amine synergists is preferably from 0.1-10 wt % based on the weight of polymerizable compounds in the composition, more preferably from 0.3-3 wt %.

Where desired, a surfactant or combination of surfactants may be included in component (iv) as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants are as described in WO 2007/018425, page 20, line 15 to page 22, line 6, which are incorporated herein by reference thereto. Fluorosurfactants are particularly preferred, especially Zonyl® FSN (produced by E.I. Du Pont).

The permeability to gases is influenced by the swellability of the discriminating layer and by plasticization. By plasticization compounds penetrate the membrane and act as plasticizer. In humid environments water (vapour) may cause the swelling but also impurities in the gas flow such as hydrocarbon compounds, alcohols, etc. may contribute. Too much swelling/plasticization may reduce the selectivity for polar gases over non-polar gases and may damage the membrane. The degree of swelling can be controlled by the types and ratio of crosslinkable compounds, the extent of crosslinking (exposure dose, photo-initiator type and amount) and by other ingredients (e.g. chain transfer agents, synergists).

In one embodiment at least two compositions are coated (simultaneously or consecutively) onto the porous support. Thus step (c) may be performed more than once, either with or without step (d) being performed between each step (c). As a consequence a composite membrane is formed comprising at least one top layer and at least one bottom layer that is closer to the porous support than the top layer. In this embodiment the top layer and bottom layer, together with any intervening layers, constitute the discriminating layer and the porous support gives strength to the composite membrane.

The composition may optionally contain polymerizable compounds having one or more functional thiol groups. These compounds may act as chain transfer agents which are known to be less sensitive to oxygen inhibition and whose usage result in a relatively uniform polymer chain length and crosslink density. Examples of thiol compounds include mercaptoacetic acid, mercaptopropionic acid, alkyl mercaptopropionate, mercapto-propylsulfonate, ethyldithiocarbonato-S-sulfopropylester, dimercaptopropane sulfonate mercaptobenzimidazole sulfonate. Preferred thiol compounds are mercaptoethanol, mercaptoethylether, mercaptobenzimidazole, ethyldithioacetate, butanethiol, and ethylenedioxydiethanethiol. Optimum quantities depend very much on the ingredients used in the composition, on the type of the chain transfer agent (reactivity) and on the irradiation dose. Therefore the optimum concentration is determined routinely on a case-by-case basis. At high levels of chain transfer agents it was found that adhesion problems may occur. When a multilayer discriminating layer is made the chain transfer agent is preferably in the top layer where the effect on surface structure is expected to be the highest. Very high levels may retard the crosslinking reaction too much resulting in a discriminating layer that is not completely polymerized and is still wet. Preferably the chain transfer agent is present in an amount between 0.001 and 1.0 mmol/g of polymerizable components. For most compounds the preferred range will be between 0.005 and 0.1 mmol/g polymerizable components. If the discriminating layer consists of more than one layer the mentioned range apply to the layer or layers comprising the chain transfer agent.

Other additives which may be included in the composition are plasticizers, such as (poly)alkylene glycol, glycerol ethers and polymer lattices with low Tg-value and the like and one or more conventional additives, such as acids, pH controllers, preservatives, viscosity modifiers, stabilisers, dispersing agents, inhibitors, antifoam agents, organic/inorganic salts, anionic, cationic, non-ionic and/or amphoteric surfactants and the like in accordance with the objects to be achieved.

The above-mentioned additives (photo-initiators, amine synergists, surfactants, chain transfer agents, plasticizers, conventional additives) may be selected from those known to a person skilled in the art and may be included in the composition in a range of preferably from 0 to 20 wt % based on the composition and its desired properties. Any of the components mentioned above may be employed alone or in combination with each other. They may be added after being solubilised in water, dispersed, polymer-dispersed, emulsified or may be converted into oil droplets.

The process of the present invention may contain further steps if desired, for example washing and/or drying the discriminating layer and removing the inert solvent from the porous layer, e.g. by evaporation.

When high intensity UV light is used in step (d) a considerable amount of heat may be generated. To prevent overheating one may therefore apply cooling air to the lamps and/or the porous support/composite membrane. Still a significant dose of IR light is irradiated together with the UV-beam. In one embodiment step (d) is performed by irradiation using UV light filtered through an IR reflecting quartz plate.

A further aspect of the present invention provides a gas separation module for separating a feed gas containing a target gas into a gas stream rich in the target gas and a gas stream depleted in the target gas, the module comprises a housing and one or more cartridges comprising a composite membrane according to the present invention.

A still further aspect of the present invention provides a gas separation cartridge comprising a composite membrane according to the present invention.

The composite membrane (which may also be referred to as a gas separation element) is preferably in tubular or, more preferably, in sheet form. Tubular forms of membrane are sometimes referred to as being of the hollow fibre type. Membranes in sheet form are suitable for use in, for example, spiral-wound, plate-and-frame and envelope cartridges.

Preferred gas separation modules comprise a composite membrane according to the present invention in the form of a spiral-wound cartridge. Such spiral-wound cartridges preferably comprise spacers and outer impermeable support layers, the spacers being positioned on each side of the composite membrane and between the membrane and the impermeable support layer and thereby defining a feed channel on one side of the membrane and a permeate channel on the other side of the membrane, wherein the membrane, spacers and outer impermeable layers are wound in a spiral manner around a core.

The spacers are typically, but not necessarily, made from plastic mesh or netting, which helps to promote turbulent flow in the gas channels. In manufacturing spiral-wound cartridges, care is taken in the choice of spacers. An overly tight mesh, may result in pressure drops along the feed or permeate channel that adversely affect separation performance when the cartridge is in use. Likewise, a tight spacer may facilitate the formation of stagnant boundary layers that give rise to concentration polarisation adjacent to the composite membrane surface. Similar issues affect the manufacture of plate-and-frame cartridges.

In spiral-wound cartridges incorporating mesh spacers, the spacers are preferably sufficiently strong to support the composite membrane and hold open the feed and permeate channels, and sufficiently open to limit pressure drops along the channels and concentration polarisation problems.

More details on the manufacture of spiral-wound cartridges can be found in U.S. Pat. Nos. 3,417,870, 4,746,430 and 5,096,584.

When the cartridge is to be used to carry out gas separation using a sweep gas on the permeate side, then the cartridge preferably also includes an inlet to the permeate side of the composite membrane by which the sweep gas can be passed into the cartridge.

Hollow fibre cartridges do not normally require spacers because the composite membranes may be held in a spaced-apart relationship by a potting compound.

Referring now to the hollow-fibre type gas separation cartridge, the gas separation cartridge preferably comprises:
(a) a tubular gas separation element comprising a wall of composite membrane and one or more gas outlets;
(b) a housing accommodating the gas separation element, the housing comprising an external wall and one or more gas outlets;
(c) a void between the element wall and the housing external wall;
(d) one or more inlets for introducing feed gas into either the tubular gas separation element or into the void;
wherein:
(i) the composite membrane is as defined in the first aspect of the present invention; and
(ii) the cartridge is constructed such that essentially the only way for the target gas to travel between the inside of the tubular gas separation element and the void is through the wall of the composite membrane.

In this preferred hollow-fibre type gas separation cartridge, the feed gas containing the target gas may be introduced into either the tubular gas separation element or into the housing void.

Thus in a first embodiment the feed gas containing the target gas is introduced into a near end of the tubular gas separation element through the one or more inlets. The feed gas then passes longitudinally within the tube, with the target gas permeating through the selective composite membrane more easily than other gases within the feed gas. A gas stream depleted in target gas may then exit the cartridge through an outlet at the far end of the tubular gas separation element. A gas stream rich in target gas may then exit the cartridge through an outlet at the far end of the housing.

In a second embodiment the feed gas containing the target gas is introduced into a near end of the housing through the one or more inlets. The feed gas then passes longitudinally within the housing, with the target gas permeating through the selective composite membrane more easily than other gases within the feed gas. A gas stream depleted in target gas may then exit the cartridge through an outlet at the far end of the housing. A gas stream rich in target gas may then exit the cartridge through an outlet at the far end of the tubular gas separation element.

Preferably at least 95%, more preferably all of the target gas which travels between the inside of the tubular gas separation element and the void (whatever the direction of flow) does so through the wall of the composite membrane.

The preferred cartridge geometries therefore include plate-and-frame, spiral-wound, hollow-fiber, tubular and envelope type. More information on cartridge geometries can be found in "Membrane Technology in the Chemical Industry", edited by S. P. Nunes and K.-V. Peinemann, page 76-78 and page 101-103 and in "Membrane Technology and Applications" (second edition), edited by R. Baker, page 139-155.

While this specification emphasises the usefulness of the composite membranes of the present invention for separating gases, especially polar and non-polar gases, it will be understood that the composite membranes can also be used for other purposes, for example providing a reducing gas for the direct reduction of iron ore in the steel production industry, dehydration of organic solvents (e.g. ethanol dehydration), pervaporation and vapour separation.

The composite membrane of the invention may be used in conjunction with other membranes or with other gas separation techniques if desired, e.g. with solvent absorption (e.g. Selexol, Rectisol, Sulfinol, Benfield), amine absorption (e.g. DEA, MDEA), physical adsorption, e.g. pressure swing adsorption, cryogenic techniques, etc. The composite membranes are particularly suitable for separating a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, $N_2$ and water vapour.

The target gas may be, for example, a gas which has value to the user of the composite membrane and which the user wishes to collect. Alternatively the target gas may be an undesirable gas, e.g. a pollutant or 'greenhouse gas', which the user wishes to separate from a gas stream in order to protect the environment.

The composite membranes are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The composite membranes of the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas; a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

Preferably the composite membrane has a $CO_2/CH_4$ selectivity ($\alpha CO_2/CH_4$)>10. Preferably the selectivity is determined by a process comprising exposing the membrane to a 50:50 mixture by volume of $CO_2$ and $CH_4$ at a feed pressure of 2000 kPa.

Preferably the composite membrane has a $CO_2/N_2$ selectivity ($\alpha CO_2/N_2$)>35. Preferably the selectivity is determined by a process comprising exposing the membrane to $CO_2$ and $N_2$ separately at feed pressures of 2000 kPa.

The invention is now illustrated by the following non-limiting examples in which all parts and percentages are by weight unless otherwise specified. ("Comp" means Comparative).

Evaluation of Gas Permeability & Selectivity

In the following Examples gas permeability and selectivity of the composite membranes was determined as follows:

(A) Gas Permeability

The flux of $CO_2$ and $N_2$ through the obtained membrane was measured at 80° C. and gas feed pressure of 2000 kPa (20 bar) using a gas permeation cell with a measurement diameter of 4.2 cm. Permeability P of $CO_2$ and $N_2$ ($P_{CO2}$ and $P_{N2}$ respectively) was calculated based on the following equation.

$$P = F \times L \times 10^{-12}/(60 \times A \times p) \text{ (unit:} m^3(STP) \cdot m/m^2 \cdot s \cdot kPa\text{)}$$

Where F is gas flow (SCCM) of $CO_2$ or $N_2$, L is membrane thickness (micrometer), A is membrane area=0.001385 $m^2$, p is feed gas pressure (kPa), and "x" stands for multiply. STP is Standard Temperature and Pressure, which is 0° C. and 1 atm, thus 1 $m^3$ (STP) is 1 $m^3$ at STP condition, SCCM is "standard cc/min", which is flow (cc/min) at STP condition ($cm^3$(STP)/min=×$10^{-6}$ $m^3$(STP)/min).

(B) Selectivity

Selectivity ($\alpha_{CO2/N2}$) was calculated from $P_{CO2}$ and $P_{N2}$ calculated above, based on following equation:

$$\alpha_{CO2/N2} = P_{CO2}/P_{N2}$$

EXAMPLES 1 TO 7 AND COMPARATIVE EXAMPLES 1 TO 5

(a) Porous Support Layers

The porous support layers used in these examples are abbreviated as follows:

GMT-L-6 was an ultrafiltration polyacrylonitrile membrane from GMT Membrantechnik GmbH, Germany.

GR70PP was an ultrafiltration polysulfone membrane from Alfa Laval.

OMEGA was an ultrafiltration (300 kD) polyethersulfone membrane from Pall.

(b) Curable Compositions

The curable compositions had the following compositions shown in Table 1 below:

TABLE 1

| Component | Curable Composition A | Curable Composition B | Curable Composition C | Curable Composition D |
|---|---|---|---|---|
| PEG600DA | 10 | 0 | 0 | 0 |
| CD9038 | 0 | 10 | 8 | 2 |
| CD553 | 0 | 0 | 0 | 6 |
| Aquacalk TWB | 0 | 0 | 2 | 2 |
| Additol HDMAP | 0.1 | 0.5 | 0.5 | 1.0 |
| Isopropanol | 10 | 6 | 6 | 6 |
| Zonyl ™ FSN-100 | 0.3 | 0.3 | 0.3 | 0.3 |
| Water | 79.6 | 83.2 | 83.2 | 82.7 |
| Viscosity at 35° C. (mPa · s) | 1.6 | 1.67 | 20.2 | 36.5 |

All amounts are expressed in wt %.

The components used in each curable composition are abbreviated in Table 2 as follows:

PEG600DA was poly(ethylene glycol) 600 diacrylate from Aldrich.

CD9038 was ethoxylated (30) bisphenol A diacrylate from Sartomer.

CD553 was methoxy poly(ethylene glycol) mono acrylate from Sartomer.

Aquacalk TWB was a chemically crosslinked poly(oxyalkylene) from Sumitomo Seika.

Additol HDMAP was a photo-initiator from Cytec Surface Specialties.

Zonyl™ FSN-100 was a surfactant from E.I. du Pont de Nemours & Co., Inc.

(c) Incorporating the Inert Liquid and Applying the Curable Composition

Several different methods were used to incorporate the inert liquid into the porous layer and apply the curable composition. These are described as follows:

Simultaneous Multilayer Process ("Multi, S")

In this process the inert liquid and the curable composition were applied continuously to the porous layer by means of a manufacturing unit. The unit comprised a curable composition application station comprising a slide bead coater using 2 slots, an irradiation source and a composite membrane collecting station. The porous support moved at a speed of 30 m/min from the application station to the irradiation source and then on to the composite membrane collecting station via a drying station.

The inert liquid was applied to the porous layer as lower layer (lower slot) and the curable composition was applied as upper layer (upper slot). Coated amounts are given below for each example. The coated support layer passed under UV curing device Light-Hammer™ LH6 from Fusion UV Systems, applying 100% intensity of the installed UV-lamp (D-bulb). Then the line proceeded further to the drying zone with a temperature of 40° C. and 8% Relative Humidity and the resultant composite membrane was collected.

Consecutive Multilayer Process ("Multi, C"):

This method was performed as described above for the Simultaneous Multilayer Process except that the inert liquid was not applied to the porous layer by the slide bead coater—instead—prior to the application of the curable composition—the inert liquid was applied to the porous layer by passing the porous layer through a bath filled with the inert liquid; excess liquid droplets on the surfaces were removed by air knife.

(d) Evaluation of Composite Membrane

Confirmation of the formation of a discriminating layer was done by surface and cross-section SEM microscopy. Successful formation of a discriminating layer was evidenced by (i) disappearance of the original porous, open surface (i.e. a closed surface was observed); and (ii) by the formation of an additional layer observed from cross-sectional examination. When the attempted formation of a discriminating layer was unsuccessful the large pores from the porous layer remained visible and (almost) no additional layer could be seen from cross sectional examination.

$CO_2$ separation was evaluated by measuring the permeance of $CO_2$ and $N_2$ gas streams. The $CO_2$ gas flux ($Q_{CO2}$) and $N_2$ gas flux ($Q_{N2}$) of the composite membranes were determined separately. Samples were set into a Millipore membrane cell with an area of 13.8 $cm^2$. $CO_2$ gas or $N_2$ gas at room temperature at a feed pressure of 2000 kPa was applied to one side of the composite membrane material and the flow rate of gas permeating through the other side of the membrane ($J_{CO2}$ or $J_{N2}$) was measured using a digital flow meter.

Permeance of $CO_2$ and $N_2$, ($Q_{CO2}$ and $Q_{N2}$, respectively) were calculated based on the following formulae:

$$Q_{CO2} = J_{CO2}/(A \cdot p)$$

$$Q_{N2} = J_{N2}/(A \cdot p)$$

where $J_{CO2}$ and $J_{N2}$, are the flow of $CO_2$ and $N_2$ through the membrane in $m^3$(STP)/$m^2 \cdot s \cdot kPa$ respectively, A is the membrane area in $m^2$ and p is the feed pressure in kPa.

Selectivity α was calculated as the ratio of the permeance of each gas, based on the following formula:

$$\alpha CO_2/N_2 = Q_{CO2}/Q_{N2}$$

An acceptable $CO_2$ selectivity was deemed to be $\alpha CO_2/N_2 > 35$.

Example 1

Composition A was used as curable composition and water was used as inert liquid. Polyacrylonitrile membrane GMT-L-6 from GMT was used as porous support. Composite membrane was formed by the Multi, S method. Water (the inert liquid) was applied as lower layer (lower slot) with 50 micron thickness, and the curable composition A was applied as upper layer (higher slot) with 20 micron thickness. The temperature of both the inert liquid as the curable composition was 35° C. The coated membrane passed under UV curing device Light Hammer LH6 from Fusion UV Systems, with 100% intensity with D-bulb installed, then the line proceeded further to the drying zone with a temperature of 40° C. and 8% relative humidity. Coating/process line speed was 30 m/min.

The resultant composite membrane had a good $CO_2$ selectivity ($\alpha CO_2/N_2 = 63$).

SEM analysis confirmed that a discriminating layer of 0.4 micron thickness had formed on the porous support.

Comparative Example 1

Example 1 was repeated except that water was not applied as lower layer. The product of the process was found to have an unacceptable $CO_2$ selectivity of $\alpha CO_2/N_2 = 20$. In contrast to Example 1, SEM analysis did not reveal a clearly identifiable discriminating layer.

Example 2

Example 1 was repeated except that in place of Composition A there was used Composition B. The lower layer (water as inert liquid) was applied with 100 micron thickness and the upper layer (curable composition) with 15 micron thickness.

The resultant composite membrane had a good $CO_2$ selectivity ($\alpha CO_2/N_2 = 49$). SEM analysis revealed a clearly identifiable discriminating layer of 0.65 micron thickness on top of the porous layer.

Comparative Example 2

Comparative Example 1 was repeated except that in place of Composition A there was used Composition B.

The product of the process was found to have an unacceptable $CO_2$ selectivity of $\alpha CO_2/N_2 = 5$. In contrast to Example 2, SEM analysis did not reveal a clearly identifiable discriminating layer.

Example 3

Example 2 was repeated except that in place of Composition B there was used Composition C.

The resultant composite membrane had a good $CO_2$ selectivity ($\alpha CO_2/N_2 = 62$). SEM analysis revealed a clearly identifiable discriminating layer of 0.925 micron thickness on top of the porous layer.

Comparative Example 3

Comparative Example 2 was repeated except that in place of Composition B there was used Composition C.

The product of the process was found to have an unacceptable $CO_2$ selectivity of $\alpha CO_2/N_2 = 15$.

In contrast to Example 3, SEM analysis did not reveal a clearly identifiable discriminating layer.

Example 4

Example 4 was prepared by the Multi, C consecutive process. In the process the membrane passed through a bath filled with water as inert liquid and excessive liquid droplets on the surfaces were removed by air knife. The saturated membrane was then coated with curable composition C by a slide bead coater with 15 micron thickness. Subsequent curing and drying steps were as described in Example 1 above.

The resultant composite membrane gave good $CO_2$ selectivity ($\alpha CO_2/N_2 = 67$).

SEM analysis confirmed that a discriminating layer of 1.2 micron thickness had formed on the porous support.

Example 5

Example 3 was repeated except that the Pall OMEGA membrane was used as porous support in place of the polyacrylonitrile membrane.

The resultant composite membrane gave good $CO_2$ selectivity ($\alpha CO_2/N_2 = 41$).

SEM analysis confirmed that a discriminating layer of 0.2 micron thickness had formed on the porous support.

Comparative Example 4

Comparative Example 3 was repeated except that the Pall OMEGA membrane was used as porous support in place of the polyacrylonitrile membrane.

The product of the process was found to have an unacceptable $CO_2$ selectivity ($\alpha CO_2/N_2 = 4$).

In contrast to Example 5, SEM analysis did not reveal a clearly identifiable discriminating layer.

Example 6

Example 3 was repeated except that the Alfa-Laval membrane GP70PP was used as support in place of the polyacrylonitrile membrane. The resultant composite membrane gave a good $CO_2$ selectivity ($\alpha CO_2/N_2 = 71$).

SEM analysis confirmed that a discriminating layer of 0.9 micron thickness had formed on the porous support.

Example 7

Example 2 was repeated except that in place of Composition B there was used Composition D.

The resultant composite membrane gave good $CO_2$ selectivity ($\alpha CO_2/N_2 = 44$).

SEM analysis confirmed that a discriminating layer of 1.2 micron thickness had formed on the porous support.

Comparative Example 5

Comparative Example 2 was repeated except that in place of Composition B there was used Composition D.

The product of the process was found to have an unacceptable $CO_2$ selectivity ($\alpha CO_2/N_2 = 5$).

SEM analysis did not reveal a clearly identifiable discriminating layer.

TABLE 2

| Example | Porous Support Layer | Curable Composition | Coating Method | Discriminating Layer Visible? | Surface Property | Discriminating Layer Thickness | Selectivity αCO$_2$/N$_2$ |
|---|---|---|---|---|---|---|---|
| 1 | GMT-L-6 | A (PEGDA) | Multi, S | Y | closed | 0.4 μm | 63 |
| C1 | GMT-L-6 | A (PEGDA) | Single | N | open | <0.1 μm | 20 |
| 2 | GMT-L-6 | B (CD9038) | Multi, S | Y | closed | 0.65 μm | 49 |
| C2 | GMT-L-6 | B (CD9038) | Single | N | open | <0.1 μm | 5 |
| 3 | GMT-L-6 | C (CD9038/AQTWB, 8:2) | Multi, S | Y | closed | 0.925 μm | 62 |
| C3 | GMT-L-6 | C (CD9038/AQTWB, 8:2) | Single | N | S open | 0.17 μm | 15 |
| 4 | GMT-L-6 | C (CD9038/AQTWB, 8:2) | Multi, C | Y | closed | 1.2 μm | 67 |
| 5 | OMEGA | C (CD9038/AQTWB, 8:2) | Multi, S | Y | closed | 0.2 μm | 41 |
| C4 | OMEGA | C (CD9038/AQTWB, 8:2) | Single | N | open | <0.1 μm | 4 |
| 6 | GR70PP | C (CD9038/AQTWB, 8:2) | Multi, S | Y | closed | 0.9 μm | 71 |
| 7 | GMT-L-6 | D (CD9038/CD553/AQTWB, 2:6:2) | Multi, S | Y | closed | 1.2 μm | 44 |
| C5 | GMT-L-6 | D (CD9038/CD553/AQTWB, 2:6:2) | Single | N | open | <0.1 μm | 5 |

AQTWB means Aquacalk TWB.
"Single" means no inert liquid was applied to the porous layer before application of the curable composition.
"C" in the Example column means "Comparative".
"Surface Property" refers to appearance of the surface when examined by SEM.
"Open" means the large pores of the porous layer were still visible,
"S Open" means some pores were visible and
"closed" means the large pores were no longer visible.

The invention claimed is:

1. A process for preparing a composite membrane comprising a porous support layer and a discriminating layer, comprising the steps of:
   (a) providing a porous support layer;
   (b) incorporating an inert liquid into the pores of the support layer;
   (c) applying a curable composition to the support layer; and
   (d) curing the composition b irradiating the composition for less than 30 seconds, thereby forming the discriminating layer on the porous support;
wherein the curable composition is a radiation curable composition and wherein the curable composition is applied continuously to the porous layer by means of a manufacturing unit comprising a curable composition application station, an irradiation source, a composite membrane collecting station, and a means for moving a porous support layer from the curable composition application station to the irradiation source and to the composite membrane collecting station.

2. A process according to claim 1 wherein oxyethylene groups constitute at least 50 wt % of the total weight of non-volatile components in the curable composition.

3. A process according to claim 1 wherein oxyethylene groups constitute at least 70 wt % and at most 96 wt % of the total weight of non-volatile components in the curable composition.

4. A process according to claim 1 wherein step (b) and (c) are performed simultaneously by curtain coating, extrusion coating, slot die coating or slide bead coating.

5. A process according to claim 1 wherein the curable composition and/or the inert liquid are applied to the support layer at a coating speed of at least 15 m/min.

6. A process according to claim 1 wherein curing of the composition begins within 7 seconds of the curable composition being applied to the porous support layer.

7. A process according to claim 1 wherein the viscosity of the curable composition when measured at 35° C. is from 1 to 1000 mPa·s.

8. A process according to claim 1 wherein at least 80 vol % of the pores of the support layer are filled with the inert liquid such that the discriminating layer is smooth.

9. A process according to claim 1 wherein the composition comprises:
   (i) 0 to 20 parts in total of monofunctional compounds;
   (ii) 1 to 20 parts in total of difunctional compounds;
   (iii) 0 to 5 parts in total of polyfunctional compounds;
   (iv) 75 to 99 parts of an inert liquid; and
   (v) 0.01 to 5 parts of photoinitiator;
wherein all parts are by weight.

10. A process according to claim 1 wherein the porous support has a CO$_2$ permeance of 5 to 150×10$^{-5}$ m$^3$(STP)/m$^2$·s·kPa.

11. A process according to claim 1 wherein oxyethylene groups constitute at least 70 wt % and at most 96 wt % of the total weight of non-volatile components in the curable composition, step (b) and (c) are performed simultaneously by curtain coating, extrusion coating, slot die coating or slide bead coating, the curable composition and/or the inert liquid are applied to the support layer at a coating speed of at least 15 m/min, curing of the composition begins within 7 seconds of the curable composition being applied to the porous support and the viscosity of the curable composition when measured at 35° C. is from 1 to 1000 mPa·s.

12. A process according to claim 9 wherein oxyethylene groups constitute at least 70 wt % and at most 96 wt % of the total weight of non-volatile components in the curable composition, step (b) and (c) are performed simultaneously by curtain coating, extrusion coating, slot die coating or slide bead coating, the curable composition and/or the inert liquid are applied to the support layer at a coating speed of at least 15 m/min, curing of the composition begins within 7 seconds of the curable composition being applied to the porous support and the viscosity of the curable composition when measured at 35° C. is from 1 to 1000 mPa·s.

13. A process according to claim 8 wherein oxyethylene groups constitute at least 70 wt % and at most 96 wt % of the total weight of non-volatile components in the curable composition, step (b) and (c) are performed simultaneously by curtain coating, extrusion coating, slot die coating or slide bead coating, the curable composition and/or the inert liquid are applied to the support layer at a coating speed of at least 15 m/min, curing of the composition begins within 7 seconds of the curable composition being applied to the porous support and the viscosity of the curable composition when measured at 35° C. is from 1 to 1000 mPa·s.

14. A process according to claim 1 wherein the inert liquid and the curable composition are coated onto the support layer by a multilayer coating method wherein a layer of the inert liquid and a layer of the curable composition are applied simultaneously to the support layer with the inert liquid layer being the lower layer and therefore contacting the support ahead of the curable composition.

15. A composite membrane obtained by a process comprising the steps of:
  (a) providing a porous support layer;
  (b) incorporating an inert liquid into the pores of the support layer;
  (c) applying a curable composition to the support layer; and
  (d) curing the composition, thereby forming the discriminating layer on the porous support;
wherein the curable composition is a radiation curable composition comprising:
  (i) 0 to 20 parts in total of monofunctional compounds;
  (ii) 1 to 20 parts in total of difunctional compounds;
  (iii) 0 to 5 parts in total of polyfunctional compounds;
  (iv) 75 to 99 parts of an inert liquid; and
  (v) 0.01 to 5 parts of photoinitiator;
wherein all parts are by weight.

16. A gas separation cartridge comprising a membrane according to claim 15.

* * * * *